F. H. CRAGO.
CURRENT MOTOR.
APPLICATION FILED AUG. 1, 1908.

973,004.

Patented Oct. 18, 1910.
4 SHEETS—SHEET 1.

Witnesses

Inventor
Felix H. Crago.
By
Attorneys

F. H. CRAGO.
CURRENT MOTOR.
APPLICATION FILED AUG. 1, 1908.

973,004.

Patented Oct. 18, 1910.
4 SHEETS—SHEET 2.

Witnesses

Inventor
Felix H. Crago.
By
Attorneys

F. H. CRAGO.
CURRENT MOTOR.
APPLICATION FILED AUG. 1, 1908.
973,004.
Patented Oct. 18, 1910.
4 SHEETS—SHEET 3.
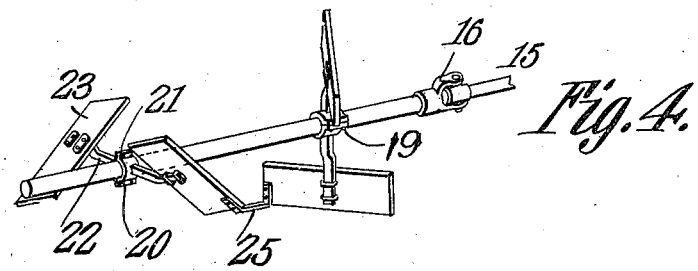
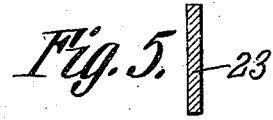  
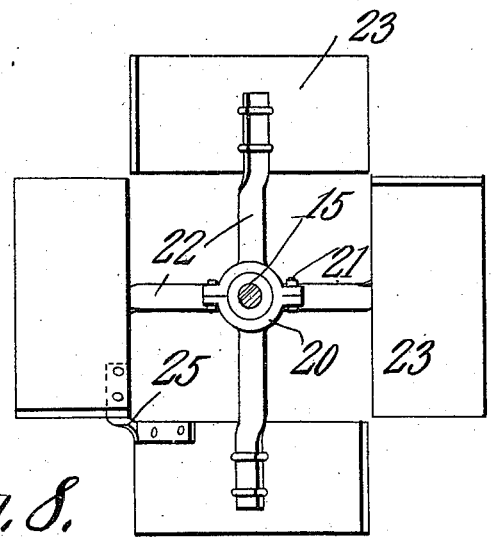
Witnesses
Inventor
Felix H. Crago.
By C. A. Snow & Co.
Attorneys

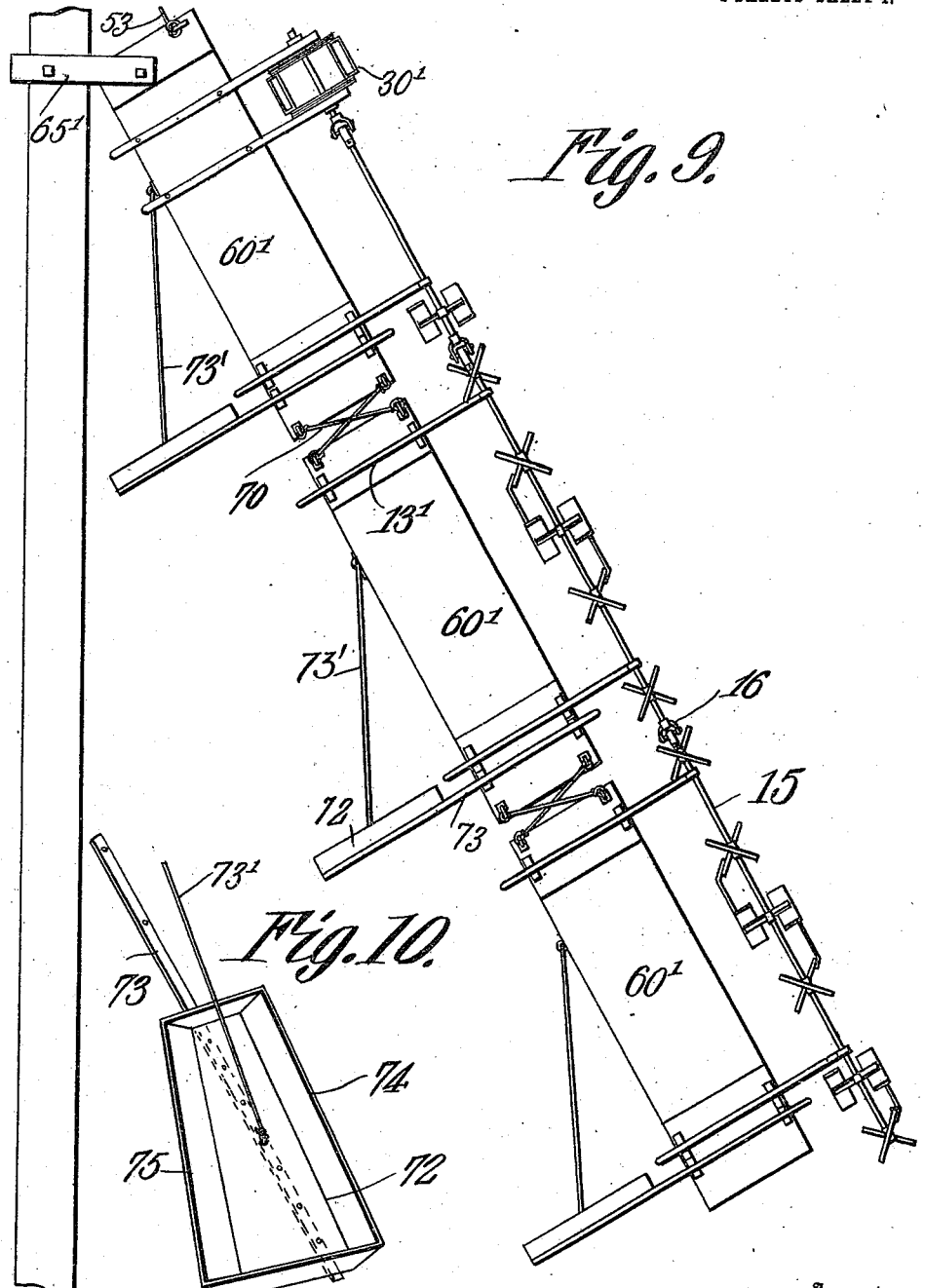

UNITED STATES PATENT OFFICE.

FELIX H. CRAGO, OF TOWNSEND, MONTANA.

CURRENT-MOTOR.

973,004. Specification of Letters Patent. Patented Oct. 18, 1910.

Application filed August 1, 1908. Serial No. 446,396.

*To all whom it may concern:*

Be it known that I, FELIX H. CRAGO, a citizen of the United States, residing at Townsend, in the county of Broadwater and State of Montana, have invented a new and useful Current-Motor, of which the following is a specification.

This invention relates to current motors and has for its principal object to provide a mechanism of simple construction whereby the force of the current in rivers, streams, or other bodies of water may be utilized for power or other purposes.

A further object of the invention is to provide an apparatus of this class which may be advantageously placed close to the shore and supported from the shore or on a boat or float, and which may be utilized for the purpose of pumping water from the stream.

A still further object of the invention is to provide an apparatus of this class in which provision is made for supporting a motor in such position that all portions thereof will be acted upon by the stream, and further to so arrange the motor that it may be readily adjusted so as to permit complete or incomplete submersion.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
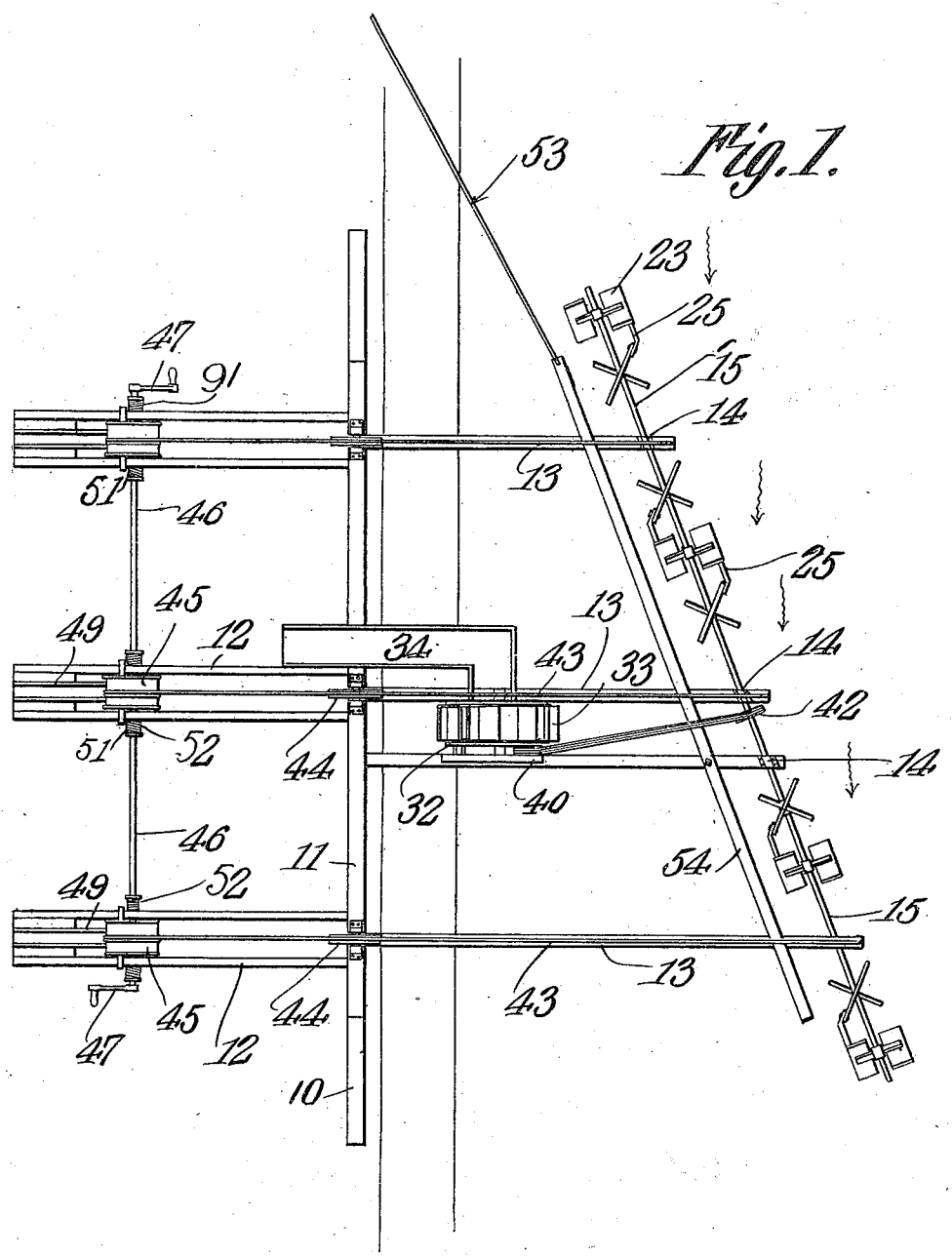
Figure 2:
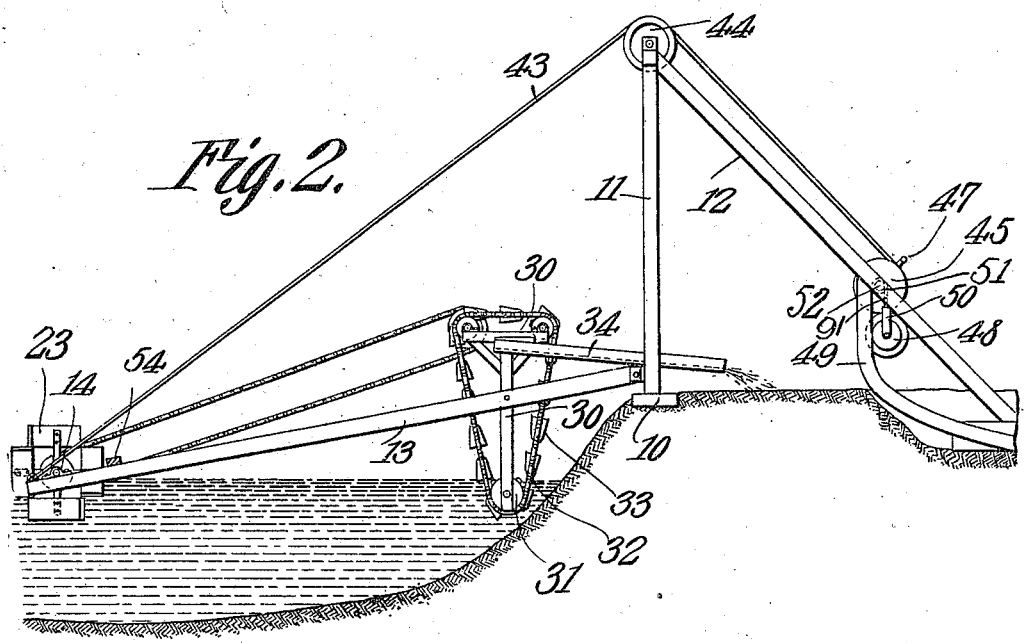
Figure 3:
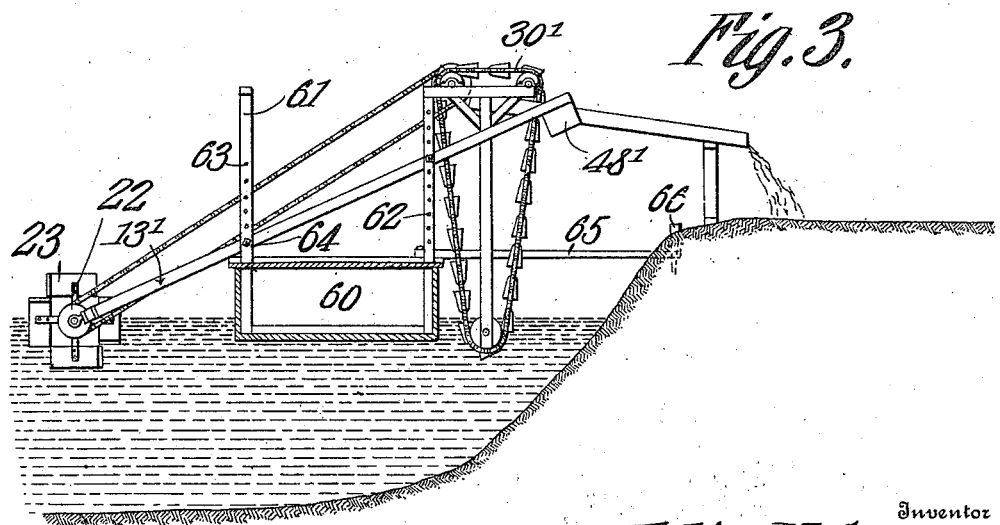

In the accompanying drawings:—Figure 1 is a plan view of a current motor constructed in accordance with the invention, showing the same as supported from the land. Fig. 2 is a transverse sectional view of the same. Fig. 3 is a view corresponding to Fig. 2, showing the motor supported from a boat or float. Fig. 4 is a detail perspective view of a portion of the motor shaft, showing a number of the blades. Figs. 5, 6, and 7 show different forms of blades which may be employed. Fig. 8 is an enlarged sectional view of the motor shaft, showing the blades. Fig. 9 is a plan view illustrating a further modification of the invention. Fig. 10 is a perspective view of one of the blades employed in the construction shown in Fig. 9, for forcing the motor out into a stream.

Similar numerals of reference are employed to indicate corresponding parts throughout the several figures of the drawings.

On the bank of the stream is placed a sill 10 from which rise standards 11 which are braced by struts 12, any desired number of uprights and struts being employed in accordance with the length and capacity of the motor.

Pivoted to each of the uprights is a boom 13 that is arranged to swing out over the stream, and the several booms are provided with bearings 14 for the reception of a shaft 15 which, if made of any considerable length, is preferably in sections and united by universal couplings 16. The booms are of different lengths as shown more clearly in Fig. 1 so that the shaft will be disposed at an angle to the bank or in the best position to receive the full force of the current, it being understood that the booms are arranged to accommodate the direction in which the current flows.

Secured to the shaft are collars 20, the collars being preferably separate and provided with bolts 19 and 21 so that they may be readily placed in position and used. Each collar carries a pair of diametrically opposed arms 22 and at the ends of these arms are plates 23 said plates being disposed at an angle to the longitudinal axis of the shaft in such a position as to present an incline surface to the direction of flow of the water. In order to secure the best results the plates 23 are preferably of concavo-convex form in cross section as shown in Fig. 7, or they may be of the shape shown in Fig. 6, or simply flat plates of the type shown in Fig. 5 may be used. The arms 22 are secured to the shaft at equally distant points and each set of arms is at a right angle to the sets between which it is located, and the plates are connected in a series and mutually braced by small bars 25 as shown in Fig. 4.

It will be seen that owing to the angle at which the shaft is set a current approaching in the direction indicated by the arrows in Fig. 1 will operate effectively on all of the blades and thus rotate the shaft.

The power is utilized in the present instance for the purpose of raising water. Secured to the boom or booms 13 is a vertical frame 30 carrying a series of sprocket wheels 31 over which passes a link belt 32. The link belt carries buckets 33 which dip down into the stream and carry water upward therefrom, the water being dumped into a chute 34 or other point to be utilized. The shaft of one of the sprocket wheels is provided with a sprocket wheel 42 on the main shaft 15, and motion is transmitted from the main shaft to the water elevator so long as the device is in operation.

The several booms 13 are pivotally mounted at their inner ends, and their outer ends are connected to cables 43 that pass over guiding sheaves 44 and then down to winding drums 45 that are carried by the struts 12. The several winding drums are secured to the shaft 46 that is provided at one or both ends with operating cranks 47, and by turning these cranks the outer ends of the booms may be raised or lowered for the purpose of vertically adjusting the water motor. By winding the cables on the drums the water motor as a whole may be raised out of the water when desired.

In order to assist the upward movement of the motor to inoperative position a plurality of counterweights 48 are employed. These weights are shown in the form of cylinders having reduced end portions that rest on curved guides 49, and the weights are suspended by yokes 50 from cables 51 that are wound around small drums 52 on the shaft 46 so that the force of the weights in acting to turn the shaft to one direction will tend to wind up the cables 43 and thus raise the water motor to inoperative position.

When the parts are in the position shown in Fig. 1 the effect of the weights is greatest and after starting to raise the booms the weights will descend in a vertical line until the booms have been moved upward to approximately an angle of 30° above the horizontal. The booms reaching this angle the winding may, of course, be effected with considerably less effort and the weights therefore become less effective inasmuch as they roll down on the guides 49, and as these guides form incline planes of a gradually reducing angle the effective force of the weights is lessened in proportion to the extent of the upward movement of the boom.

In order to prevent strain and hold the shaft in proper position a line 53 is preferably passed from the forward end of the bar 54 which connects all of the booms together to a stationary support on the shore this line serving to resist the strain due to the operation of the motor.

Where the device is used on a boat such as 60 in Fig. 3 the boat is provided with a plurality of sets of guiding posts 61 and 62 each of which has a series of openings 63 for the passage of bolts 64. The booms 13′ in this instance are provided at one end with fixed counter-weights 48′ serving to raise the shaft of the motor from the water. In the construction shown in Fig. 3 the motor is arranged at one side of the boat or float and the water elevator 30′ is arranged at the opposite side thereof so that the weight will be evenly distributed and the boat maintained in a level or approximately level position. To assist in holding the boat in place a series of bars 65 are employed to connect the boat to stationary stakes 66 on the bank of the stream.

In the construction shown in Fig. 9 a number of floats 60′ are employed, these being coupled together by crossing chains or cables 70 and each float carries arms 13′ of the construction shown in Fig. 3, the motor shaft 15 being mounted in bearings in the outer ends of these arms, and the several motor shaft sections being connected together at the ends of the floats by the universal couplings 16. This will permit of the ready addition or subtraction of floats when it is desired to increase or decrease the power. The float 60′ which is nearest the bank is connected at the forward end to the bank by a bar 65′, and by a line 53 to an upstream point of the shore so that the entire line of floats may freely swing outward into the current in order to be presented at an angle thereto. The floats are held out in operative position by means of blades 72 that are carried by bars 73 mounted in the same manner as the shaft carrying bars 13′ so that when necessary they may be lifted out of the water and maintained in inoperative position.

When the blades 72 are immersed in the water they will act as rudders which being presented at an angle to the line of the current will compel the several floats to move outward. Each blade is held in position partly by a line or rod 73′, and the forward face of the blade is in the form of a bucket, the lower edge of which is inclined as indicated at 74 so that under the action of the current there will be a tendency to force the blade downward and thus to a certain extent counterbalance the weight of the motor mechanism at the opposite side of the float. Excessive downward movement is prevented by the inclined edge 75 at the top of the blade so that if there is a tendency of the blade to move downward beyond the normal the two incline faces 74 and 75 will be opposite to each other and will, to a certain extent, counterbalance each other so that further downward movement will be prevented.

What is claimed is:—

1. In a current motor, a power shaft carrying a plurality of motor blades disposed along said shaft, a water elevator having one end dipping into the stream, a support for the shaft and water elevator, anchoring means extending from the support to the shore in an upstream direction, and means for maintaining the down stream end of the shaft at a greater distance from the shore of the stream than the upstream end of said shaft.

2. In an apparatus of the class described, a supporting means, a water elevator mounted thereon, a shaft carried by the supporting means a flexible connection between the shaft and the water elevator, a plurality of blades secured to said shaft and adapted to be actuated by the current of the water, and means for maintaining the shaft at an angle to the flow of the current with the down stream end farther from the shore of the stream than the upstream end.

3. In a current motor of the class described, a series of floats, a shaft section carried by each float, motor blades on each shaft section, detachable connections between the shaft sections and between the floats, each float constituting a separate unit of the motor, and blades projecting outward from the floats at the side opposite to the motor shaft and serving as rudders to hold the float out in the current.

4. In a current motor of the class described, a series of independent units each comprising a float, a motor shaft supported thereby, motor blades on the shaft, a blade extending outward from the opposite side of the float and serving as a rudder, and detachable connections for the float sections and for the sections of the shaft.

5. In a current motor of the class described, a float, a motor arranged at one side of the float, and a blade extending from the opposite side of the float and arranged to be immersed in the water said blade having an inclined edge and being arranged to be depressed by the action of the current to counterbalance the weight of the motor.

In testimony that I claim the foregoing as my own, I have hereto affixed my signature in the presence of two witnesses.

FELIX H. CRAGO.

Witnesses:
  L. ROTWITT,
  J. P. KEARNS.